United States Patent [19]

Robeson et al.

[11] Patent Number: 4,624,997

[45] Date of Patent: Nov. 25, 1986

[54] ARTICLE MOLDED FROM A BLEND OF A POLY(ARYL ETHER KETONE) AND A POLY(ARYL ETHER SULFONE)

[75] Inventors: Lloyd M. Robeson, Whitehouse Station; James E. Harris, Piscataway, both of N.J.

[73] Assignee: Union Carbide Corporation, Danbury, Conn.

[21] Appl. No.: 655,584

[22] Filed: Sep. 28, 1984

[51] Int. Cl.⁴ .......................................... C08F 283/00
[52] U.S. Cl. .................................. 525/471; 525/534; 525/535
[58] Field of Search ........................ 525/471, 534, 535

[56] References Cited

U.S. PATENT DOCUMENTS

| | | | |
|---|---|---|---|
| 3,324,199 | 6/1967 | Tocker | 260/857 |
| 3,729,527 | 4/1973 | Nield | 525/534 |
| 3,787,363 | 1/1974 | Staniland et al. | 525/535 |
| 4,108,837 | 8/1978 | Johnson et al. | 528/126 |
| 4,435,350 | 3/1984 | Fukushima et al. | 528/125 |

FOREIGN PATENT DOCUMENTS 2108983  5/1983  United Kingdom ............... 525/471

Primary Examiner—Melvyn I. Marquis
Attorney, Agent, or Firm—Donald M. Papuga

[57] ABSTRACT

Described herein is an article molded from a blend of a poly(aryl ether ketone) and a poly(aryl ether sulfone). These molded articles exhibit decreased shrinkage and warpage.

25 Claims, No Drawings

ARTICLE MOLDED FROM A BLEND OF A POLY(ARYL ETHER KETONE) AND A POLY(ARYL ETHER SULFONE)

BACKGROUND OF THE INVENTION

This invention is directed to an article molded from a blend of a poly(aryl ether ketone) and a poly(aryl ether sulfone).

Poly(aryl ether ketones) are crystalline polymers. They offer many property advantages which include solvent resistance, excellent wear and abrasion resistance, and excellent environmental stress crack resistance. Crystallization, however, causes a specific property deficiency in applications involved with replicating a mold surface, contour, or volume. Under certain conditions (e.g. injection molding), crystalline polymers exhibit high warpage. This is at least partially due to the high shrinkage of crystalline polymers (relative to amorphous polymers) and the problem of non-uniform shrinkage. This problem is compounded when the crystalline poly(aryl ether ketone) is annealed above its glass transition temperature. The applications where shrinkage and warpage minimization is highly desired include electrical connectors, bearings, sleeves, high tolerance applications, long injection molded parts, etc.

The requirements for a polymeric additive that will reduce the warpage and shrinkage problems for poly(aryl ether ketones) would include the following characteristics:

(1) Thermal stability is required at poly(aryl ether ketone) processing temperatures (minimum of 40° C. above the poly(aryl ether ketone) crystalline melting point. This requires a polymeric additive which must be stable at 380° C. and higher and exceeding 420° C. for injection molding conditions. This requirement eliminates almost all polymer classes.

(2) Another key requirement is that phase separation occurs so that the crystallinity of poly(aryl ether ketones) can be retained during the molding cycle.

(3) The polymer additive should be amorphous so it would also not add to the shrinkage and warpage problems.

(4) The polymer additive should be thermoplastic and exhibit equal to lower melt viscosity than the poly(aryl ether ketone).

(5) The polymer additive should exhibit mechanical compatability with the poly(aryl ether ketone) such that at least additive strength and thoughness properties are achieved.

(6) The polymer additive should have a Tg of >175° C. so that a higher modulus above 150° C. to at least 175° C. can be achieved by the blend than the poly(aryl ether ketone) alone.

Of the many classes of polymers available, a class which would meet all of the requirements would be desirable and unique.

Blends of poly(aryl ether ketones) and poly(aryl ether sulfones) have been briefly alluded to in the patent literature. British Pat. No. 1,446,962 (page 3, lines 28 to 32) states:

"The aromatic polyether ketone may be blended with other thermoplastic polymeric substances, for example, polyesters, polyolefins, polyamides, polysulfones, and poly(vinyl chloride). The composition may be further mixed with particles; e.g., elastomeric materials and polytetrafluoroethylene."

This disclosure generally describes blends of poly(aryl ether ketones) and poly(aryl ether sulfones). However, the above-quoted statement contains many inaccuracies. Blending poly(vinyl chloride) at temperatures >300° C. would give instantaneous degradation yielding large quantities of hydrochloric acid as well as other noxious by-products. Polyolefins, polyesters (e.g., poly(ethylene terephthalate, poly(butylene terephthalate) and polyamides (e.g., nylon 6, nylon 6,6, nylon 11, and nylon 12) also will severely degrade at processing temperature in excess of 300° C. and thus produce useless blends with poly(aryl ether ketones).

U.S. Pat. No. 3,324,199 describes blends of a specific poly(aryl ketone) containing ortho hydroxy groups (relative to the ketone group). These materials are described as ultraviolet light stabilizers for a variety of polymers including polyethylene, polypropylene, poly(vinyl chloride), poly(vinylidene chloride), polyacrylic acid esters, polyacrylonitrile, polyvinyl fluoride, polyvinylidene fluoride, polytetrafluoroethylene, polychlorotrifluoroethylene, polyesters, polyamides, and polyimides. These poly(aryl ether ketones) are generally amorphous and require aromatic hydroxyls ortho to the main chain ketones. The poly(aryl ketones) of this invention are crystalline, have no ortho hydroxyls, and could not be blended with many of the above mentioned polymers as the melting point of the poly(aryl ether ketones) are higher than the degradation temperature of most of the above cited polymers.

U.S. Pat. No. 4,435,350 describes a method for the orientation of thermoplastic polyether ether ketone films. The patent states that the polyether ether ketone may be blended with other resins such as polyarylene polyether polysulfone for the purpose of improving the fluidity of the polyether ether ketone in extrusion processing. The examples in this patent describe extruding of the polyether ether ketone into films. This patent does not disclose or suggest that the polyether ether ketone alone or blended with another resin can be formed into molded articles.

One method which has been found to decrease this shrinkage and warpage problem is to add a high glass transition temperature (Tg), amorphous poly(aryl ether sulfone) to the crystalline poly(aryl ether ketone).

THE INVENTION

This invention is directed to an article molded from a blend of a poly(aryl ether ketone) and a poly(aryl sulfone).

In the blends, the poly(aryl ether ketone) is used in amounts of from about 5 to about 95, preferably from about 20 to about 75 weight percent while the poly(aryl ether sulfone) is used in amounts of from about 95 to about 5, preferably from about 35 to about 80 weight percent.

THE MOLDED ARTICLE

The preferred method of molding the material described herein is by injection molding. Injection molding involves heating a material in a barrel and injecting by the forward motion of a ram or a screw into a mold cavity. The details of injection molding are described in "Injection Molding Theory and Practice" by Irvin I. Rubin, Wiley-Intersciene, New York, 1972. Other methods of molding whereby shrinkage and warpage would be reduced by using the materials of this invention as compared with poly(aryl ether ketone) not containing poly(aryl ether sulfone) include compression molding and transfer molding. The detailed description of these processes are described in "Plastics Process Engineering" by James L. Throne, Marcel Dekker, Inc., New York (1979) (ISBN 0-8247-67004) and "Plastic Product Design, Ronald D. Beck, Van Nostrand Reinhold Co., New York, 1980 (ISBN 0-442-20632-1).

The articles of specific interest are those articles which are large or long whereby warpage problems are most common or on parts where dimensional tolerances are critical. Typical molded parts would include connectors, trays, housing gears, optical equipment, sleeves, bearings, and printed circuit boards.

THE POLY(ARYL SULFONES)

The poly(aryl ether sulfones) are thermoplastic polymers containing recurring units of the following formula:

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromtic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl

sulfone

or hydrocarbon residue in which the two phenolic nuclei are joined to the same or different carbon atoms of the residue.

Such dinuclear phenols can be characterized as having the structure:

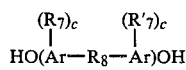

wherein Ar is an aromatic group and preferably is a phenylene group, $R_7$ and $R'_7$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_8$ is representative of a bond between aromatic carbon atoms as in dihydroxyl-diphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl)alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorphenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-(4-hydroxyphenyl)-1-phenyl-propane,
2,2-bis-(4-hydroxyphenyl)1,1,1,3,3,3,-hexafluoropropane, and the like;
di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;
di(hydroxyphenyl)ethers such as bis-(4-hydroxyphenyl)ether, the 4,3'-,
4,2'-2,2'-2,3-,dihydroxyphenyl ethers,
4,4'-dihydroxyl-2,6-dimethyldiphenyl ether,bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxyl-3,6-dimethoxydiphenyl ether.

As herein used the E' term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine subsituted benzenoid compound are most preferred, particularly when there is a trace of water present in the polymerization reaction system. However, this water content should be maintained below about 1% and preferably below 0.5% for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

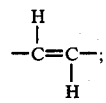

the sulfoxide group

the azo group —N=N—; the saturated fluorocarbon groups

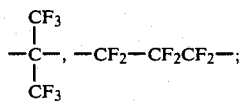

organic phosphine oxides

where $R_9$ is a hydrocarbon group, and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Pat. No. 847,963 wherein the bisphenol and dihalobenzenoid compound are heated in the presence of potassium carbonate using a high boiling solvent such as diphenylsulfone.

Preferred polyarylene polyethers of this invention are those prepared using the dihydric polynuclear phenols of the following four types, including the derivatives thereof which are substituted with inert substituent groups

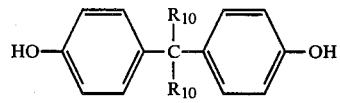
(a)

in which the $R_{10}$ groups represent independently hydrogen, lower alkyl, aryl and the halogen substituted groups thereof, which can be the same or different;

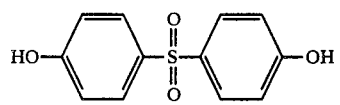
(b)

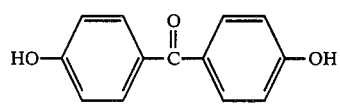
(c)

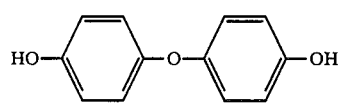
(d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The poly(aryl ether)s have a reduced viscosity of from about 0.35 to about 1.5 as measured in an appropriate solvent at an appropriate temperature depending on the particular polyether, such as in methylene chloride at 25° C.

The preferred poly(aryl ether)s have repeating units of the formula:

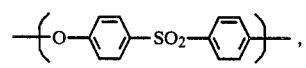,

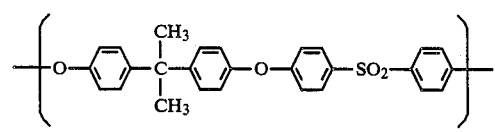

The poly(aryl sulfones) of this invention include thermoplastic polymers containing units of the formula:

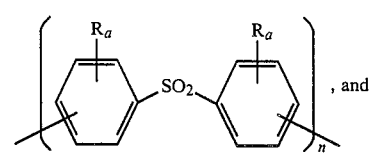, and
(I)

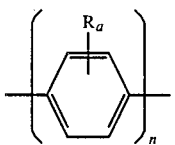
(II)

and/or:

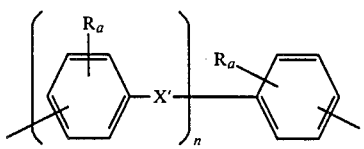
(III)

wherein R is independently hydrogen, $C_1$ to $C_6$ alkyl or $C_4$ to $C_8$ cycloalkyl, X' is independently:

wherein $R_1$ and $R_2$ are independently hydrogen or $C_1$ to $C_9$ alkyl, or:

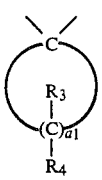

wherein $R_3$ and $R_4$ are independently hydrogen or $C_1$ to $C_8$ alkyl, and $a_1$ is an integer of 3 to 8; —S—, —O—, or

, a is an integer of 0 to 4 and n is independently an integer of 1 to 3 and wherein the ratio of unit (I) to the sum of units (II) and/or (III) is greater than 1. The units are attached to each other by an —O— bond.

A preferred polymer of this invention contains units of the formula:

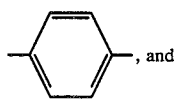, and

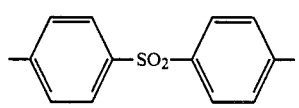

Another preferred polyarylethersulfone of this invention contains units of the formula:

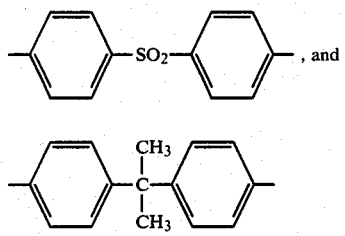

These units are attached to each other by an —O— bond.

The polyarylethersulfone may be random or may have an ordered structure.

The polyarylethersulfones of this invention have a reduced viscosity of from about 0.4 to greater than about 2.5, as measured in N-methylpyrolidone, or other suitable solvent, at 25° C.

The polyarylethersulfones of this invention are prepared by reacting the monomers represented by the following formulae:

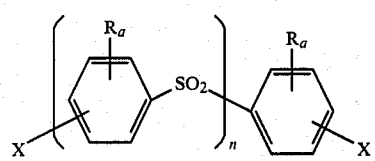 (IV)

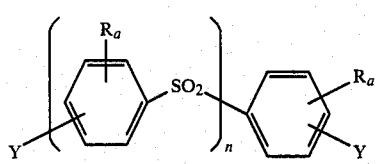 (V)

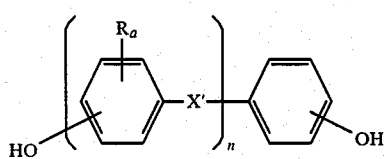 (VI)

and/or

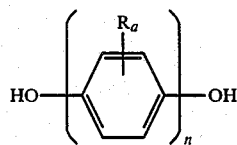 (VII)

wherein R, a, X' and n are as previously defined, and X and Y are independently selected from Cl, Br, F, $NO_2$ or OH and at least 50 percent of the Y's are OH.

The ratio of the concentration of OH groups to Cl, Br, F and/or $NO_2$ groups used to form the polyarylethersulfone is from about 0.90 to about 1.10, preferably from about 0.98 to about 1.02.

The monomers, represented by formulas (IV), (V), (VI) and (VII), include the following:
2,2-bis(4-hydroxyphenyl)propane,
bis(4-hydroxyphenyl)methane,
4,4'-dihydroxydiphenyl sulfide,
4,4'-dihydroxydiphenyl ether,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro-4'-hydroxydiphenyl sulfone,
4,4'-biphenol, hydroquinone, and the like.

The preferred monomers include hydroquinone, 4,4-biphenol, 2,2-bis(4-hydroxyphenyl) propane, 4,4'-dichlorodiphenyl sulfone, and 4,4'-dihydroxydiphenyl sulfone or 4 chloro -4'-hydroxydiphenyl sulfone.

The polymers are prepared by contacting substantially equimolar amounts of the hydroxy containing compounds (depicted in formulas (IV) to (VII) supra) and halo and/or nitro containing compounds (depicted in formula (IV) and (V) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at from about 120° to about 180° C., for about 1 to about 5 hours and then raised and kept at from about 200° to about 250° C., preferably from about 210° to about 230° C., for about 1 to 10 hours.

The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

$$R_5—S(O)_b—R_5$$

in which each $R_5$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

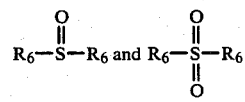

where the $R_6$ groups are independently lower alkyl, such as methyl, ethyl, propyl, butyl, and like groups, and aryl groups such as phenyl and alkylphenyl groups such as the tolyl group, as well as those where the $R_6$ groups are interconnected as in a divalent alkylene bridge such as:

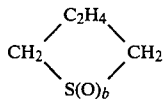

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 7:1 to about 5:1.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

Other poly(aryl ether sulfones) which are suitable for use in this invention contain at least one biphenyl unit in the structure. These poly(aryl sulfones) are described in U.S. patent application Ser. No. 655,580, now abandoned, filed in the name of J. E. Harris et al titled "Blends of A Biphenyl Containing Poly(Aryl Sulfone) and a Poly(Aryl Ether Ketone)", filed on the same date as this application, and commonly assigned. The preferred biphenyl containing poly(aryl ether sulfone) contain the repeating unit:

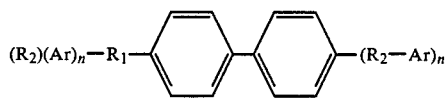

wherein $R_1$ and $R_2$ are —O—, —SO$_2$—,

S with the proviso that at least one of $R_1$ and $R_2$ is —SO$_2$— and when n is O, $R_1$ is SO$_2$, Ar is arylene of 6 to 24 carbon atoms, preferably phenylene or biphenylene; a and n are 0 to 4.

The preferred poly(aryl sulfones) include those having the following reoccurring units:

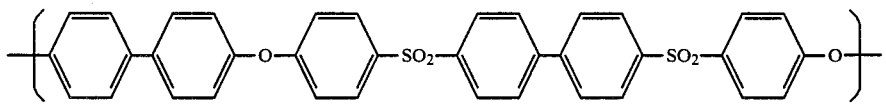

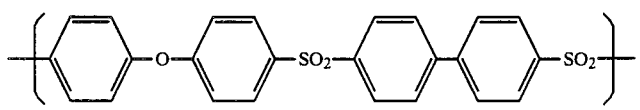

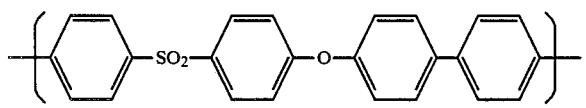

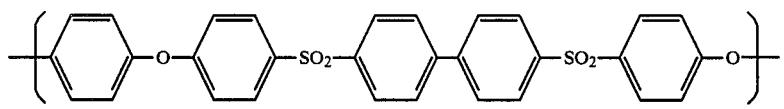

The poly(aryl ether sulfones) are produced by methods well known in the art such as those described in U.S. Pat. Nos. 3,634,355; 4,008,203; 4,108,837 and 4,175,175.

THE POLY(ARYL ETHER KETONE)

The crystalline poly(aryl ether ketone)s which are suitable for use herein can be generically characterized as containing a repeating unit of one or more of the following formulae:

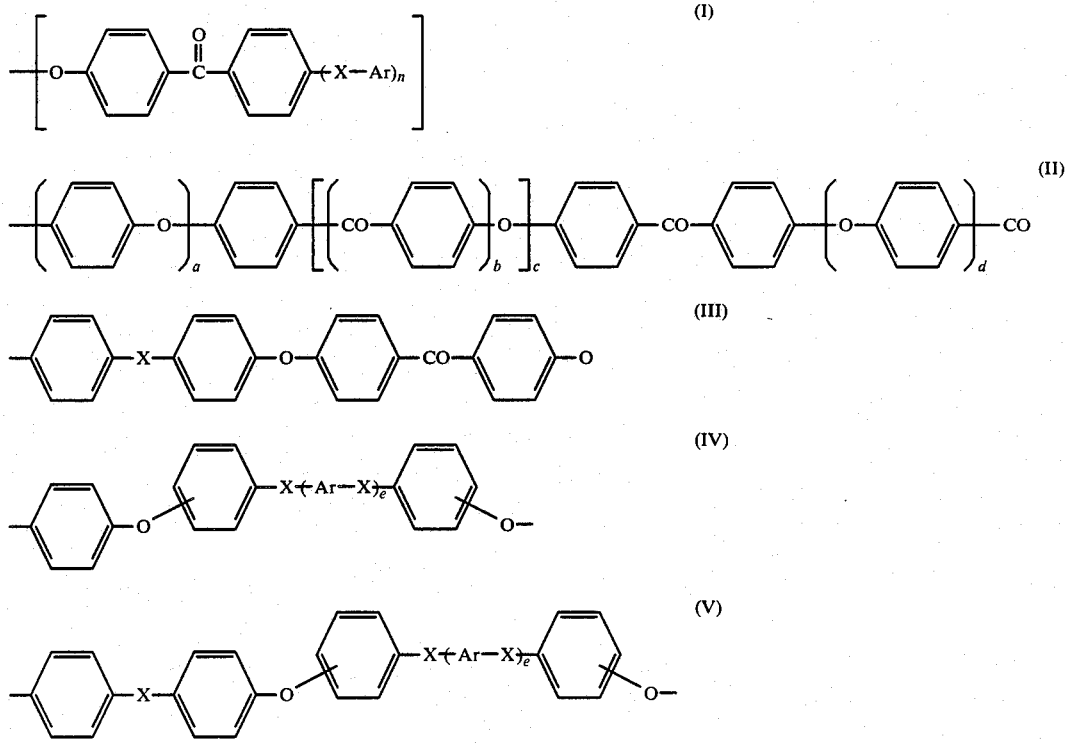
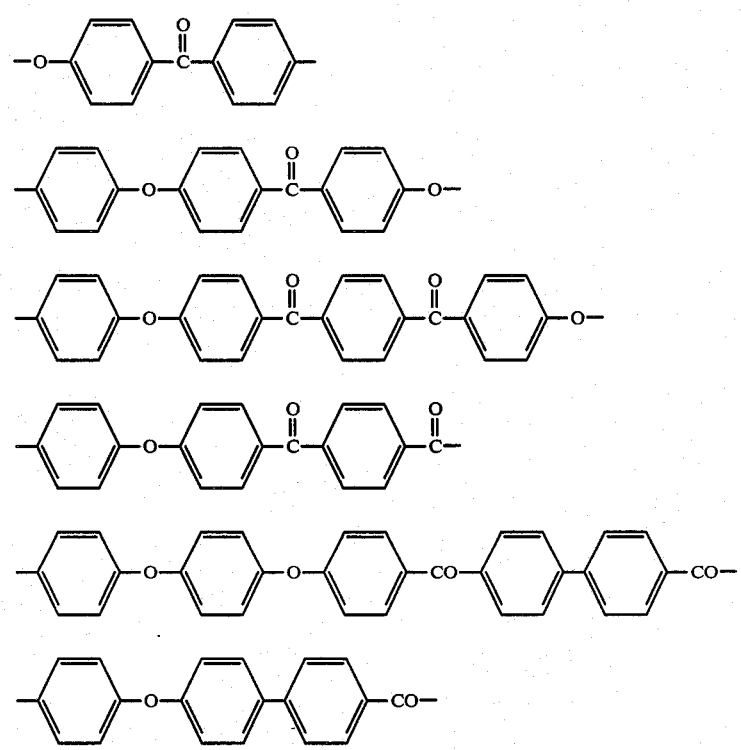
wherein Ar is independently a divalent aromatic radical selected from phenylene, biphenylene or naphthylene, X is independently O,
or a direct bond and n is an integer of from 0 to 3, b, c, d and e are 0 or 1 and a is an integer of 1 to 4 and preferably d is 0 when b is 1.
Preferred poly(aryl ketone)s include those having a repeating unit of the formula:

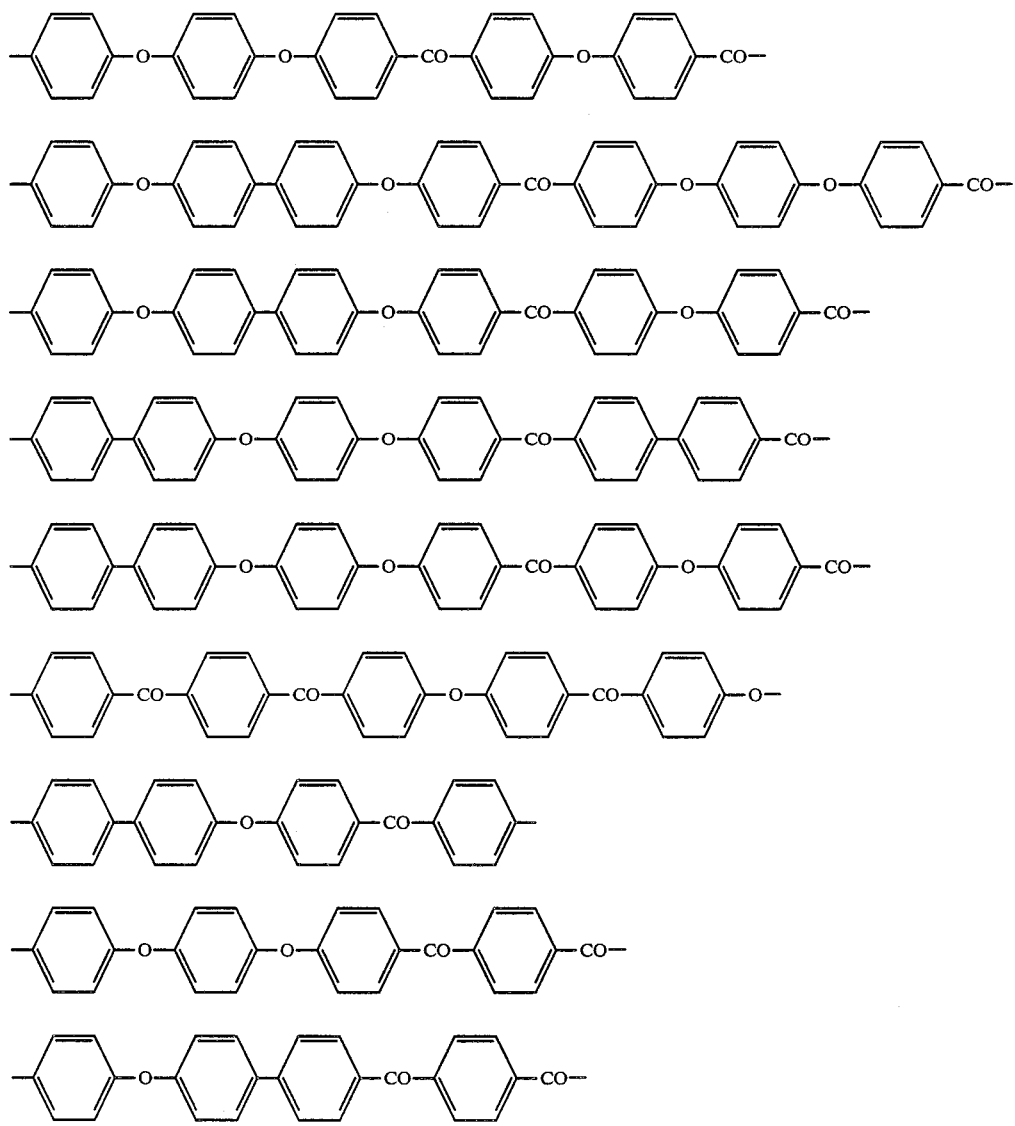

These poly(aryl ketone)s are prepared by methods well known in the art. One such method comprises heating a substantially equimolar mixture of at least one bisphenol and at least one dihalobenzoid compound or at least one halophenol compound as described in Canadian Pat. No. 847,963. Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and dihalobenzoid compounds include:
4-(4-chlorobenzyl)phenol,
4,4'-difluorobenzophenone,
4,4'-dichlorobenzophenone,
4-chloro-4'-fluorobenzophenone,

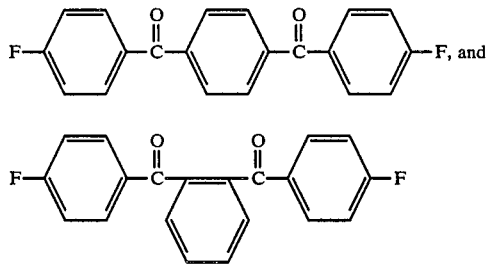

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halphenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.5 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ketone)s such as those containing repeating units of the formula:

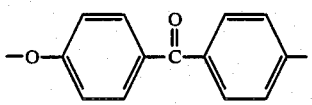

may be produced by Friedel-Craft reactions utilizing hydrogen fluoride-boron trifluoride catalysts as described, for example, in U.S. Pat. No. 3,953,400.

Additionally, poly(aryl ketones) of the following formula:

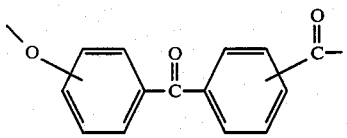

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication No. T103,703 and U.S. Pat. No. 4,396,755. In this process, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ether ketone)s of the following formulas:

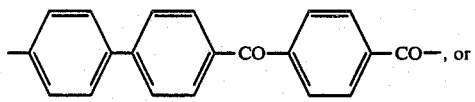

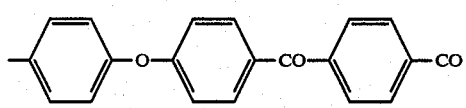

may also be prepared according to the process as described in, for example, U.S. Pat. No. 4,398,020. In such a process, (a) a mixture of substantially equimolar amounts of
  (i) at least one aromatic diacyl halide of the formula

where —Ar— is a divalent aromatic radical, Y is halogen and COY is an aromatically bound acyl halide group, which diacyl halide is polymerizable with at least one aromatic compound of (a)(ii), and
  (ii) at least one aromatic compound of the formula

where —Ar'— is a divalent aromatic radical and H is an aromatically bound hydrogen atom, which compound is polymerizable with at least one diacyl halide of (a)(i), and (b) at least one aromatic monoacyl halide of formula

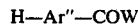

where —Ar"— is a divalent aromatic radical and H is an aromatically bound hydrogen atom, Y is halogen, and COY is an aromatically bound acyl halide group, which monoacyl halide is self-polymerizable, and (c) a combination of (a) and (b) in the presence of a fluoroalkene sulphonic acid.

The term poly(aryl ether ketone) as used herein is meant to include homopolymers, copolymers, terpolymers, graft copolymers, and the like. For example, any one or more of the repeating units (I) to (V) may be combined to form copolymers, etc.

The poly(aryl ether ketone)s have a reduced viscosity of at least about 0.4 to about 5.0 dl/g, as measured in concentrated sulphuric acid at 25° C.

It should, of course, be obvious to those skilled in the art that other additives may be included in the blends of this invention. These additives include plasticizers; pigments; flame retardants; reinforcing agents, such as glass fibers; thermal stabilizers; ultraviolet light stabilizers; impact modifiers, and the like.

EXAMPLES

The following examples serve to give specific illustrations of the practice of this invention but they are not intended in any way to limit the scope of this invention.

The following designations are used in the examples and they have the following meaning:

Polyketone I: A polymer having a repeating unit of the formula:

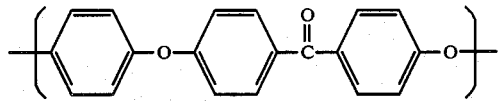

having a reduced visocisty of 1.2 dl/g as measured in 96% sulfuric acid (1 wt. % solution) at 25° C. (PEEK obtained from Imperial Chemicals Co.)

Polysulfone I: A polymer having a repeating unit of the formula:

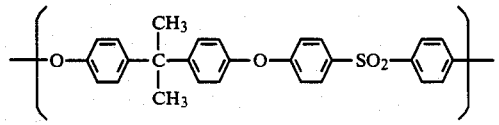

having a reduced viscosity of 0.49 dl/g as measured in chloroform at 25° C. (0.2 gr/100 ml).

Polysulfone II: A polymer having a repeating unit of the formula:

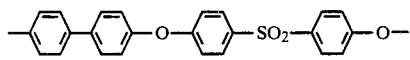

having a reduced viscosity of 0.59 dl/g as measured in N-methylpyrolidone at 25° C. (0.2 gr/100 ml).

Polysulfone III: A polymer having a repeating unit of the formula:

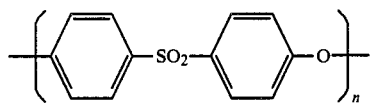

having a reduced viscosity of 0.48 dl/g as measured in N-methyl pyrrolidone (0.2 gr/100 ml) at 25° C.

Polysulfone IV: A polymer having the following repeating unit:

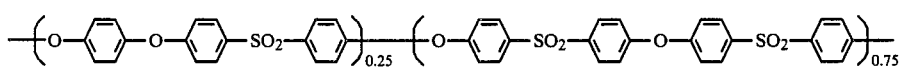

having a reduced viscosity of 0.61 dl/g as measured in N-methyl-pyrolidone (0.2 gr/100 ml) at 25° C.

EXAMPLES 1 TO 4

Polyketone I and Polysulfone I were blended in the amounts shown in Table I in a 24/1 L/D single screw 1" extruder at 360°-380° C. The resultant extrudate was pelletized and injection molded at 370°-390° C. into test specimens using a Newbury screw injection molding machine. The samples were tested for tensile modulus, tensile strength and elongation at break as per ASTM D-638, notched izod impact strength as per ASTM-D-256, tensile impact strength as per ASTM D-1822, heat distortion temperature as per ASTM D-648, flexural modulus and flexural strength as per ASTM D-790.

The environmental stress rupture resistance was measured on 20 mil thick ⅛" wide strips shear cut from compression molded samples. The samples were stressed to predetermined tensile stress levels by weighted lever arms. A cotton swab was attached to the center of the specimen and saturated with the environment to be tested. Aluminum foil was placed around the saturated cotton swab to prevent evaporation as well as evaporation cooling of the environment. The time to rupture was determined and if no rupture occurred within a specific time interval the sample was checked for crazing and for embrittlement. The mechanical property results and environmental stress rupture results are shown in Table I.

TABLE I

| | Example | | | | |
|---|---|---|---|---|---|
| | 1 | 2 | 3 | 4 | Control |
| | Composition | | | | |
| | 80% Polysulfone I 20% Polyketone | 60% Polysulfone I 40% Polyketone | 40% Polysulfone I 60% Polyketone | 20% Polysulfone I 80% Polyketone | Polysulfone I |
| Tensile Modulus (psi) | 381,000 | 405,000 | 435,000 | 477,000 | 370,000 |
| Tensile Strength (psi) | 10,500 | 11,000 | 11,600 | 12,300 | 10,000 |
| % Elongation | 133 | 125 | 120 | 97 | 100 |
| Notched Izod Impact Strength (ft-lbs/in of notch) | 1.4 | 1.5 | 1.3 | 1.5 | 1.3 |
| Tensile Impact Strength (ft-lbs/in$^2$) | 171 | 157 | 165 | 135 | 180 |
| Flexural Modulus (psi) | 404,000 | 425,000 | 440,000 | 477,000 | 380,000 |
| Flexural Strength (5% strain) psi | 15,900 | 16,800 | 17,500 | 18,600 | 15,400 |
| Heat Distortion Temperature 264 psi; ⅛" bar (°C.) | 161 | 157 | 153 | 146 | 168 |

| Environmental Stress Rupture Resistance | | |
|---|---|---|
| Environment | Stress | Time to Rupture |
| Acetone | 500 | 1 sec. R. |
| | 1000 | 14 sec. R  2 hrs. NCNB |
| | 2000 | 0.52 hrs. R |
| Ethyl Acetate | 500 | 1 sec. R. |
| | 1000 | 12 sec. R |
| | 2000 | 0.35 hrs. R |
| Toluene | 500 | 1 sec. R. |
| | 1000 | 44 sec. R |
| | 2000 | 1.49 hours R |
| Trichloroethylene | 500 | 2 sec. R. |
| | 1000 | 0.22 hrs. R |
| | 2000 | 0.26 hrs. R |

EXAMPLES 6 TO 8

Blends of polysulfones and polyketones of the types and the amounts shown in Table II were blended by the procedure as described in Examples 1 to 5. The blends were then injection molded into test bars as described in Examples 1 to 5.

The mold shrinkage of flexural bars (mold length=5.000") was measured with calipers to the nearest 0.001". These samples included Polyketone I as well as blends with Polysulfone I, II, and III. The same flexural bars were placed in an air circulating oven at 165° C. for two hours and the flexural bar length was remeasured after cooling to room temperature. The results are shown in Table 2.

TABLE II

MOLD SHRINKAGE DATA

| | Control | 5 | 6 | 7 | 8 | Control |
|---|---|---|---|---|---|---|
| | | | Example | | | |
| | | | Composition | | | |
| | Polyketone | 20% Polysulfone I 80% Polyketone | 60% Polysulfone I 40% Polyketone | 50% Polysulfone II 50% Polyketone | 50% Polysulfone III 50% Polyketone | Polysulfone I |
| Flexural Bar Length* As Molded (inches) | 4.976 | 4.980 | 4.987 | 4.980 | 4.983 | 4.980 |
| Annealed for 2 hours at 165° C. (inches) | 4.935 | 4.944 | 4.973 | 4.966 | 4.970 | 4.974 |
| Mold Shrinkage (%) (as molded) | 0.48% | 0.40% | 0.26% | 0.40% | 0.34% | 0.40% |
| Mold Shrinkage (%) (after annealing for 2 hours at 165° C.) | 1.3% | 1.1% | 0.54% | 0.68% | 0.60% | 0.52% |

*Mold Cavity length = 5.000"

EXAMPLES 9 TO 12

The Polyketone, Polysulfone IV and Fiber Glass (OCF 497B, Owens-Corning Corp., Huntington, PA) were blended in a one inch (L/D=24) extruder equipped with a Maddox mixing head at about 360° C. The compositions shown in Table III were prepared by the procedure described in Examples 1 to 5, chopped into pellets and molded into ASTM ⅛" tensile bars on a Newbury 1¼ oz. reciprocating screw injection molding machine at about 380° C. The molded parts were tested for heat deflection temperature (264 psi, ⅛"); tensile strength, modulus and % elongation at break at 23° C., 100° C., 150° C. and 200° C.; notched Izod impact strength; and tensile impact strength. The results are shown in Table III. As can be seen, these composites have excellent mechanical property profiles useful to temperatures above 200° C. In addition, the addition of Polysulfone IV to the Polyketone in composites permits the use of higher mold temperatures while maintaining fast cycle times. This results in parts with improved dimensional stability.

TABLE III

PROPERTIES OF POLYKETONE/POLYSULFONE IV/FIBERGLASS COMPOSITES

| | Control | 9 | 10 | 11 | 12 | Control |
|---|---|---|---|---|---|---|
| | | | Example | | | |
| Composition | | | | | | |
| Polykeytone (%) | — | 48 | 45.5 | 58.5 | 24.5 | 80 |
| Polysulfone IV (%) | 80 | 32 | 24.5 | 31.5 | 45.5 | — |
| Fiberglass (%) | 20 | 20 | 30 | 10 | 30 | 20 |
| HDT (°C.) (⅛", 264 psi) | 213 | 212–217 | 210 | 200 | 211 | >246° C. |
| Tensile Strength (psi) | | | | | | |
| @ 23° C. | 15,200 | 19,000 | 18,900 | 14,900 | 17,000 | 20,000 |
| @ 100° C. | 11,100 | 14,600 | 14,600 | 11,300 | 13,900 | — |
| @ 150° C. | 8,750 | 8,700 | 8,400 | 6,000 | 8,900 | — |
| @ 200° C. | 3,000 | 4,000 | 4,500 | — | 4,100 | — |
| Tensile Modulus (ksi) | | | | | | |
| @ 23° C. | 825 | 1,020 | 1,230 | 688 | 1,140 | 1,100 |
| @ 100° C. | 700 | 890 | 456 | 423 | 614 | — |
| @ 150° C. | 560 | 570 | 392 | 230 | 354 | — |
| @ 200° C. | 210 | 130 | 233 | 133 | 205 | — |
| Notched Izod (ft-lbs/in) ⅛" | 1.1 | 1.3 | 1.2 | 1.0 | 1.1 | 1.4 |
| Tensile Impact (ft-lbf/in²) | 31 | 26 | 25 | 27 | 35 | 50 |

EXAMPLES 13 TO 15

Blends of polyketone and polysulfone of the types and in the amounts shown in Table IV were blended by the procedure as described in Examples 1 to 5. The blends were compression molded into a 4"×4"×0.020" mold cavity. ⅛" strips were shear cut and mounted between grips in an Instron testing machine. The 1% secant modulus was determined at various temperatures. The data on these samples is shown in Table IV. Polysulfone I offers higher stiffness only at 160° C. and 170° C. The other poly(aryl ether sulfones) offer a significant increase in the stiffness of Polyketone for the temperature range of 150°–200° C.

TABLE IV

MODULUS-TEMPERATURE DATA FOR
POLY(ARYL ETHER KETONE)/POLY(ARYL ETHER SULFONE) BLENDS
1% Secant Modulus (psi)

| | | Example | | |
|---|---|---|---|---|
| | Control | 13 | 14 | 15 |
| | | Composition | | |
| Temperature | Polyketone | 60% Polyketone 40% Polysulfone I | 50% Polyketone 50% Polysulfone II | 50% Polyketone 50% Polysulfone III |
| 140° C. | 275,000 | 245,000 | 250,000 | 255,000 |
| 150° C. | 200,000 | 175,000 | 200,000 | 190,000 |
| 160° C. | 122,000 | 130,000 | 135,000 | 145,000 |
| 170° C. | 74,000 | 100,000 | 112,000 | 135,000 |
| 180° C. | 57,000 | 28,000 | 98,000 | 125,000 |
| 190° C. | 42,000 | 16,000 | 82,000 | 116,000 |
| 200° C. | 36,000 | 11,500 | 54,000 | 102,000 |

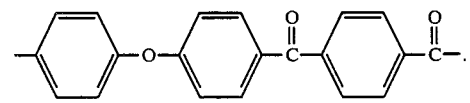

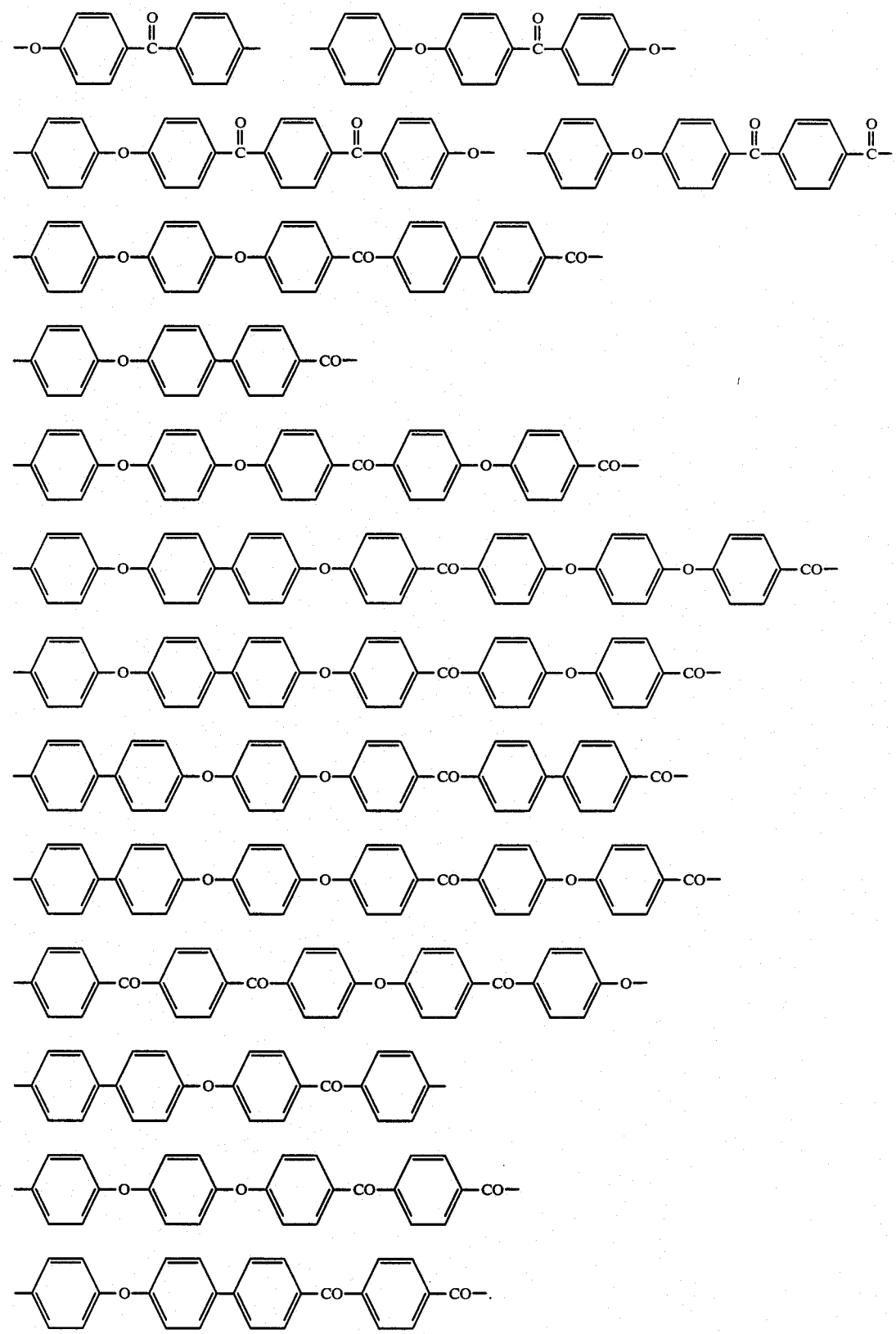

What is claimed is:

1. An article molded from a blend of from about 5 to about 95 weight percent of a crystalline poly(aryl ether ketone) and from about 95 to about 5 weight percent of an amorphous poly(aryl ether sulfone) containing recurring units of the following formula:

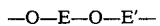

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms; said poly(aryl ether ketone) having a reduced viscosity of at least about 0.4 to about 5.0 dl/g as measured in concentrated sulphuric acid at 25° C. and said poly(aryl ether sulfone) having a reduced viscosity of from about 0.4 to greater than 2.5 as measured in N-methylpyrolidone at 25° C.

2. An article as defined in claim 1 wherein the poly(aryl ether sulfone) has repeating units of the formula:

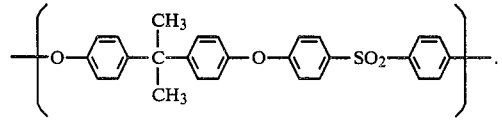

3. An article as defined in claim 1 wherein the poly(aryl ether sulfone) has repeating units of the formula:

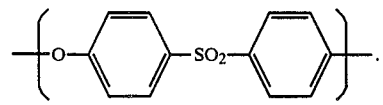

4. An article as defined in claim 1 wherein the poly(aryl ether sulfone) contains units of the following formula:

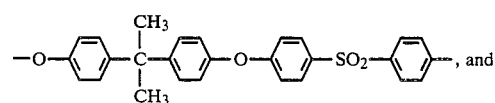

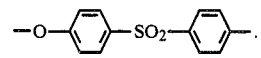

5. An article as defined in claim 1 wherein the poly(aryl ether sulfone) contains units of the following formula:

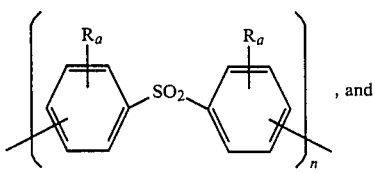
, and

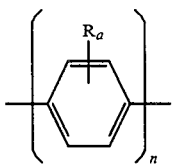

and/or

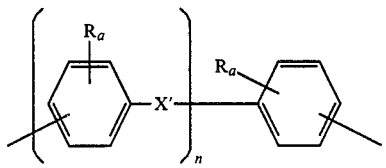

wherein R is independently hydrogen, $C_1$ to $C_6$ alkyl or $C_4$ to $C_8$ cycloalkyl, X' is independently

wherein $R_1$ and $R_2$ are independently hydrogen or $C_1$ to $C_9$ alkyl, or

wherein $R_3$ and $R_4$ are independently hydrogen or $C_1$ to $C_8$ alkyl, and $a_1$ is an integer of 3 to 8; —S—, —O—, or

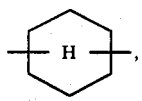

a is an integer of 0 to 4 and n is independently an integer of 1 to 3 and wherein the ratio of unit (I) to the sum of units (II) and/or (III) is greater than 1, wherein the units are attached to each other by an —O— bond.

6. An article as defined in claim 5 wherein in the poly(aryl ether sulfone), unit (I) has the formula:

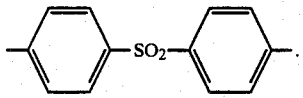

7. An article as defined in claim 5, wherein in the poly(aryl ether sulfone), unit (II) has the formula:

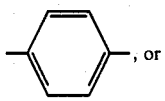

8. An article as defined in claim 5, wherein in the poly(aryl ether sulfone), unit (III) has the formula:

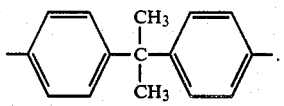

9. An article as defined in claim 5, wherein the poly(aryl ether sulfone) contains recurring units of the formula:

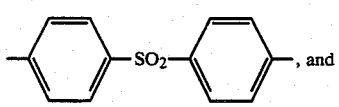

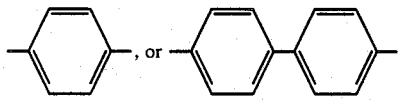

said units being attached to each other or by an —O— bond.

10. An article as defined in claim 5, wherein the poly(aryl ether sulfone) contains recurring units of the formula:

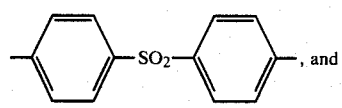

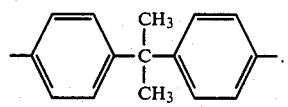

11. A molded article as defined in claim 1 wherein the poly(aryl ether sulfone) contains the repeating unit:

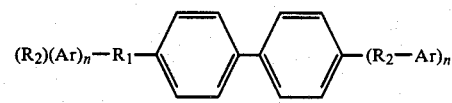

wherein $R_1$ and $R_2$ are —O—, —SO$_2$—, $$\overset{O}{\underset{C,}{\|}}$$

S with the proviso that at least one of $R_1$ and $R_2$ is —SO$_2$— and when n is O, $R_1$ is SO$_2$, Ar is arylene of 6 to 24 carbon atoms, preferably phenylene or biphenylene; a and n are 0 to 4.

12. A molded article as defined in claim 1 wherein the poly(aryl ether sulfone) has the following repeating unit:

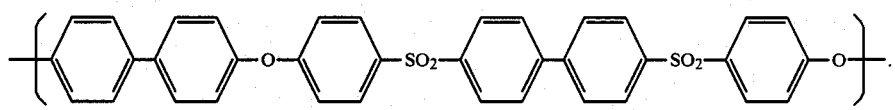

13. A molded article as defined in claim 1 wherein the poly(aryl ether sulfone) has the following repeating unit:

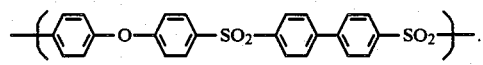

14. A molded article as defined in claim 1 wherein the poly(aryl ether sulfone) has the following repeat unit:

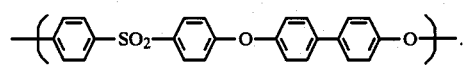

15. A molded article as defined in claim 1 wherein the poly(aryl ether sulfone) has the following repeat unit:

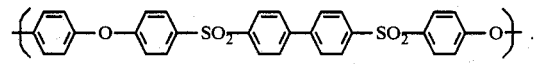

16. A molded article as defined in claim 1 wherein the poly(aryl ether ketone) has a repeating unit of the following formula:

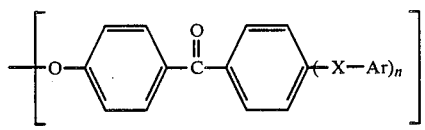

wherein Ar is independently a divalent aromatic radical selected from phenylene, biphenylene or naphthylene, X is independently O,

or a direct bond and n is an integer of from 0 to 3.

17. A molded article as defined in claim 1 wherein the poly(aryl ether ketone) has a repeating unit of the following formula:

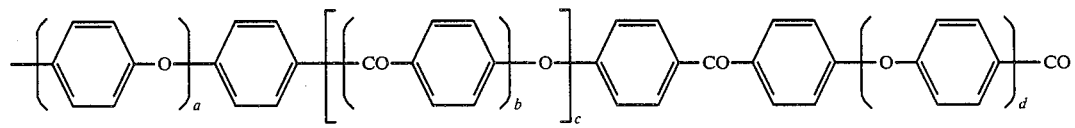

wherein a is an integer of 1 to 4 and b, c, and d are 0 to 1.

18. A molded article as defined in claim 1 wherein the poly(aryl ether ketone) has a repeating unit of the following formula:

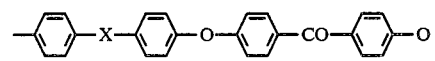

wherein X is independently O,

or a direct bond.

19. A molded article as defined in claim 1 wherein the poly(aryl ether ketone) has a repeating unit of the following:

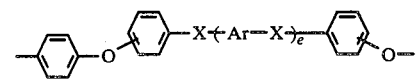

wherein Ar is a divalent aromatic radical selected from phenylene, biphenylene or napthylene, X is independently O,

or a direct bond and e is 0 or 1.

20. A molded article as defined in claim 1 wherein the poly(aryl ether ketone) has a repeating unit of the following formula:

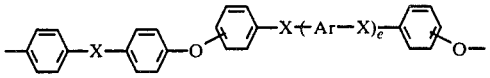

wherein Ar is a divalent aromatic radical selected from phenylene, biphenylene or naphthylene, X is independently O,

or a direct bond and e is 0 or 1.

21. A molded article as defined in claim 1 wherein the poly(aryl ether ketone) has a repeating unit of the formula:

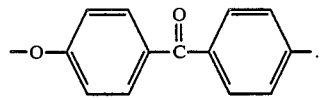

22. A molded article as defined in claim 1 wherein the poly(aryl ether ketone) has a repeating unit of the formula:

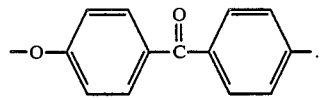

23. A molded article as defined in claim 1 wherein the poly(aryl ether ketone) has a repeating unit of the formula:

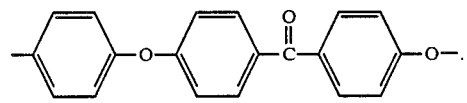

24. A molded article as defined in claim 1 wherein the poly(aryl ether ketone) has a repeating unit of the formula:

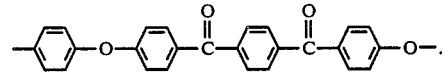

25. A molded article as defined in claim 1 wherein the poly(aryl ether ketone) has a repeating unit selected from one or more of the following: